March 29, 1949.  K. MARSH  2,465,544
METAL MELTING

Original Filed May 10, 1946  2 Sheets-Sheet 1

INVENTOR
KIRTLAND MARSH
BY
Ernest Low.
ATTORNEY

March 29, 1949.　　　　K. MARSH　　　　2,465,544
METAL MELTING

Original Filed May 10, 1946　　　　2 Sheets-Sheet 2

INVENTOR
KIRTLAND MARSH
BY
Ernest Low
ATTORNEY

Patented Mar. 29, 1949

2,465,544

UNITED STATES PATENT OFFICE 2,465,544

METAL MELTING

Kirtland Marsh, Pittsburgh, Pa., assignor to Aluminum Company of America, Pittsburgh, Pa., a corporation of Pennsylvania Original application May 10, 1946, Serial No. 668,904. Divided and this application June 11, 1948, Serial No. 32,371

5 Claims. (Cl. 75—65)

1

The present invention relates in general to methods of melting metals, and is particularly concerned with melting, remelting and/or reclaiming readily oxidizable metals, such as aluminum, magnesium and alloys thereof, existing in the form of finely divided scrap metal composed of scalpings, borings, chips, turnings, saw dust, foil, finely divided powders, together with such larger and heavier charges as discarded castings, sprues, gates, runners and partial or whole ingots.

Suitable apparatus for carrying out the method of this invention is disclosed and claimed in my copending application, Serial No. 668,904, filed May 10, 1946, of which this application is a division.

The recovery of scrap metal in general normally requires its remelting. In the remelting of light metal scrap, it is well known to introduce the fine aggregate of such scrap below the surface of a body of molten metal in order to avoid excessive metal losses by reason of oxidation, and to utilize the furnace heat to drive off volatilizable substances contaminating the scrap metal without subjecting the same to the open flame of the heat producing medium within the furnace. Such recovery methods have usually incorporated submersible charging tubes extending below the surface of a molten metal bath. It is also well known to agitate molten metal to submerse finely divided scrap therebelow in reclamation processes.

The methods of the art, however, have not taught reclaiming metal made up from scrap of varying weights and densities at one and the same time, it having been normal practice to separately melt the fine or light weight scrap and heavier scrap in separate furnaces, thereby exposing the scrap to double melting, with attendant oxidation and handling losses.

It is an object of the present invention to provide an improved method for producing a uniform grade of metal from scrap of varying degrees of bulk and weight.

It is a further object to provide an improved method for continuously melting metal of varying weight and bulk with a minimum amount of loss due to oxidation during the melting operation.

It is a further object of the present invention to provide methods for producing molten metal from scrap metal of varying weight including a fine aggregate, such as borings, scalpings, foil, turnings, saw dust and the like, and heavier stock, such as ingots, croppings, sprues, gates, discarded castings, and the like.

Other objects will be apparent from a consideration of the description in the following specification, as pointed out in the appended claims.

The annexed drawings and the following description set forth in detail certain means and methods of carrying out the invention, such disclosed means illustrating a preferred form in which the principle of the invention may be successfully practiced.

Figure 1:
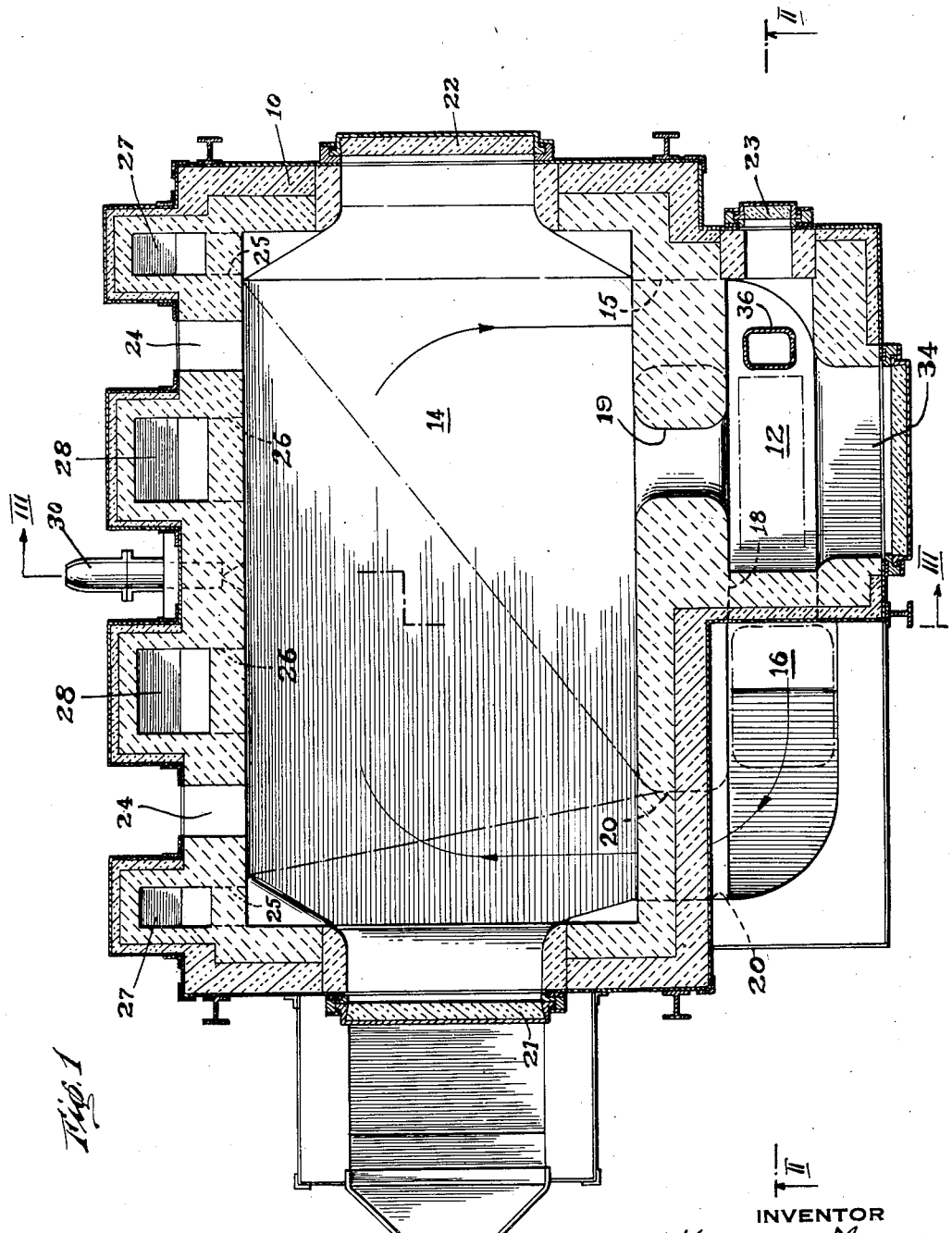
Fig. 1 represents a furnace structure in sectional plan view embodying the characteristics of the present invention.

The improved methods of practice of the present invention make it possible to melt or remelt scrap metal wherein the total charge of metal is fed to a furnace at two separated charging points. Fine aggregate of the charge, normally floatable upon the surface of the molten metal, is mechanically submerged in a forehearth forming an integral part of the main furnace hearth. Heavy scrap is fed into a portion of the forehearth removed from interference with the mechanical scrap submerger. Both forms of the charged crap are subjected to the influence of the temperature of the molten metal within the main furnace hearth, which is maintained in circulation through the main and forehearths through the medium of the aforementioned mechanical scrap submerging mechanism.

The design and arrangement of the forehearth and main hearth, together with their associated elements to be hereinafter more fully described, are such that the light weight scrap, readily oxidizable in the case of aluminum, magnesium and their alloys, is intermittently or continuously fed and mechanically submerged beneath the molten metal surface in a substantially closed chamber forming a portion of the forehearth. The bulky and heavy scrap is charged into an open portion of the forehearth out of contact with the mechanical submerging mechanism. Communication ducts between the forehearth and main hearth, under the action of the mechanical scrap submerger, set up circulatory flow of the molten metal within the furnace and forehearth to maintain a melt of uniform consistency and insure flow of the relatively hot molten metal from the main hearth through the forehearth.

Referring to the drawings, reference numeral 10 represents a furnace constructed from exterior steel and interior fire brick, or suitable insulation, in accordance with well recognized principles of furnace design. Attached to the furnace 10, and preferably forming an integral part thereof, is an enclosed chamber 12, which extends outwardly from the main hearth 14 of the furnace and communicates therewith through a duct or opening 15 in a wall of furnace 10. Chamber 12 has formed, as an integral extension thereof, an open top channel 16 in communication with chamber 12 through an aperture or duct 18, as well as in communication with the main hearth 14 through opening or duct 20.

Chamber 12 and open top trough 16 combine to constitute a forehearth which occupies substantially the length of one side wall of furnace 10, chamber 12 being enclosed within the brick and steel structure defining walls and roof thereof, and the trough portion 16 being open to the atmosphere over its top surface.

Figure 3:
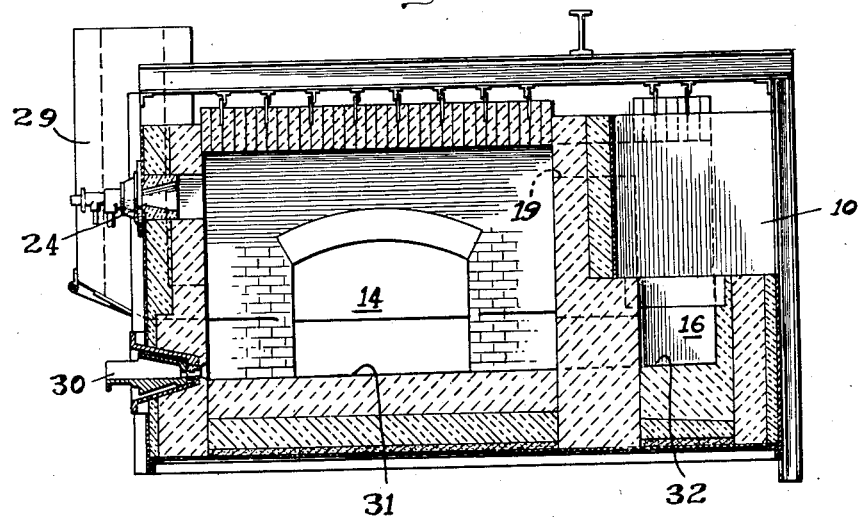
Fig. 3 represents a sectional view of the furnace structure illustrated in Fig. 1 and taken along the line III—III thereof.

The furnace 10 is preferably provided with end doors 21, 22 and 23, and burner openings 24, ducts 25 and 26 through the side wall of the furnace 10, opposite to that of the forehearth, being provided in communication with flues or stacks 27 and 28, respectively, for purposes of carrying off gases and products of combustion within the furnace hearth 14. In the preferred form of the structure of this invention, two additional flues (not shown), one at each end of the furnace, are usually provided, all of the flues being preferably designed to enter a common stack or flue, a portion of one stack being shown at 29, Fig. 3. The furnace floor 31, including the floor 32 in the forehearth, is generally sloped towards the furnace wall in which drain spout 30 is located, whereby the furnace and forehearth may be drained as desired. Also, a tapping spout, (not shown), is normally provided at an elevation slightly higher than the drain spout for tapping off the molten charge for subsequent use in the production of castings, or to a holding pot or ladle prior to use in casting procedures. The diagonal broken lines in the forehearth 14 (Fig. 1) represent the intersection of floor surfaces generally sloping toward the furnace wall in which drain spout 30 is located.

Chamber 12 is equipped with an aperture 34 in its side wall for introduction therethrough of mechanical devices 35 (shown in broken line construction in Fig. 1) for submerging light weight scrap fed thereto through a chute 36. Submerging, stirring and agitating devices, such as disclosed and claimed in my application Serial No. 668,905, filed on May 10, 1946, which incorporate a door or aperture sealing member, have been found entirely satisfactory for adaptation to the chamber 12 of this invention.

In the practice of the invention, molten metal is acquired within the furnace and forehearth structure, preferably up to a minimum level which seals off the duct 15. The remaining communicating ducts 18 and 20 are preferably not submerged, which permits dross floating on the molten metal to be circulated into the main hearth for skimming purposes. Charging of the furnace is accomplished by melting down the metal of a previous charge left within the furnace 10, or by charging scrap or virgin metal into the furnace and melting the same through the combustion of fuel and/or gases emanating from burners projecting into the furnace 10 through apertures 24.

Figure 2:
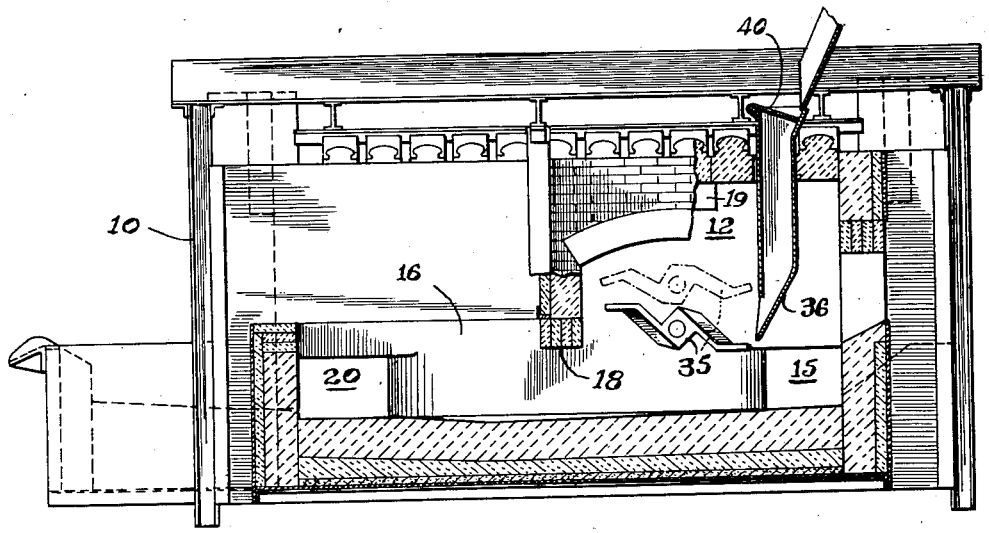
Fig. 2 represents a sectional view of the furnace structure illustrated in Fig. 1, with part thereof broken away, and taken along the line II—II thereof.

The light weight, or normally floatable scrap is preferably fed into the stand pipe or chute 36 in any suitable manner, or through door 23, intermittently or by a continuous conveyor (not shown), and is immediately submerged by paddle members 35, (shown in Fig. 2 in full lines in scrap submerging position and in broken lines in raised entry position), which are adapted to rotate in a clockwise direction, as viewed in Fig. 2. Stand pipe 36 is preferably provided with a hinged cap 40 that may be closed during intermittent charging. Simultaneously therewith, or as desired, heavy, normally sinkable scrap is charged into the open trough 16, preferably above the station represented by the broken line rectangle in Fig. 1, where it gravitationally sinks to the bottom of the forehearth. Circulation of the molten metal will follow the directional arrows illustrated on Fig. 1, the molten metal being drawn into chamber 12 through aperture 15 and propelled outwardly therefrom through opening 18 into trough 16, from where it will flow over the submerged heavy scrap, through aperture 20, back to the hearth 14.

The metal within the hearth 14 is exposed to the highest furnace temperature, as can be recorded by suitably installed pyrometric equipment. Burners, extending through openings 24, serve to maintain the required temperature. It will also be appreciated that chamber 12 will stand at some lower temperature since this chamber is not directly exposed to the burners of the main hearth. An aperture 19, however, has been found beneficial, and permits flow of heat from the main hearth to the chamber 12. There is, then, less tendency for the light weight scrap in chamber 12 to be exposed to oxidation because this light weight aggregate is submerged rapidly and is not exposed to the high temperature or open flame of the main hearth.

The circulation of the melt into trough 16 sets up a flow over the bulky, heavy charge within this trough which, in effect, is a washing action by the hot molten metal which serves to melt down this heavy scrap.

The need for exposing the chamber 12 to atmospheric conditions is practically eliminated once the apparatus is set in operation and the process gets under way, further eliminating any undue exposure of the light weight scrap which is more susceptible to oxidation in view of its large surface area, as compared to heavy scrap in block or equivalent form, fed to the trough 16.

It will be seen from a consideration of the operation above described that the invention in its broadest aspect, as a method, comprises melting, remelting and/or reclaiming metal from scrap of varying weights, and involves forcibly submerging the light weight scrap values beneath the surface of a molten metal pool, and circulating the molten metal across heavy scrap values to melt the latter, the circulation involving a flow of relatively hot molten metal through a forehearth containing a molten metal bath at some lower temperature.

It will also be appreciated that normal fluxing methods may be incorporated in the method herein contemplated, solid or gaseous fluxing media having been found satisfactory. Metal skimming operations can likewise be carried out, the doors 21, 22 and 23 being useful for this purpose.

Other modes of carrying out the invention, not specifically disclosed in the specification, will present themselves to those skilled in this art. The invention, then, is not to be limited to the precise disclosure given hereinabove, except as defined in the language employed in the appended claims.

What is claimed is:

1. In a method of melting scrap metal of varying weight, the steps comprising, forcibly submerging light weight, normally floatable metal scrap beneath the surface of a small body of molten metal, gravitationally charging the heavier scrap metal beneath the surface of the small body of molten metal, and establishing circulation between the small body of molten metal and a larger body of the same, whereby a melt of uniform consistency is obtained.

2. In a method of melting readily oxidizable scrap metal of varying weight, the steps comprising, forcibly submerging light weight, normally floatable scrap aggregate beneath the surface of a small body of molten metal in a substantially closed chamber, gravitationally charging heavier scrap aggregate beneath the surface of the small body of molten metal outside said chamber, and establishing circulation between the small body of molten metal and a larger body of the same, whereby a melt of uniform consistency is obtained.

3. In a method of melting readily oxidizable metal made up from scrap metal of varying weight and bulk, the steps comprising, setting up a circulatory flow of molten metal between a large heated body and a relatively small body of the same, forcibly submerging that portion of the normally floatable scrap beneath the surface of the small body of molten metal out of contact with the means for heating the large body of molten metal, and gravitationally submerging the heavier scrap beneath the same small body of molten metal at a point removed from submersion of the floatable scrap.

4. In a method of melting scrap metal of varying weight, the steps comprising, forcibly submerging light weight, normally floatable metal scrap beneath the surface of a small body of molten metal out of contact with the atmosphere, gravitationally charging heavier scrap metal beneath the surface of a portion of the small body of molten metal in contact with the atmosphere, and establishing circulation between the small body and a larger body of molten metal while subjecting the large body of molten metal to a higher temperature than the small body of molten metal.

5. In a method of melting scrap metal of varying weight, the steps comprising, providing a large body of molten metal and a small body of the same, forcibly submerging light weight, normally floatable metal scrap beneath the surface of the small body of molten metal out of contact with the atmosphere, gravitationally charging heavier scrap metal beneath the surface of the small body of molten metal at a point removed from submersion of the normally floatable scrap and in contact with the atmosphere, and setting up a circulatory flow of molten metal in a direction from the large body through the small body thereof.

KIRTLAND MARSH.

REFERENCES CITED

The following references are of record in the file of this patent:

UNITED STATES PATENTS

| Number | Name | Date |
|---|---|---|
| 1,515,616 | Poppenhusen | Nov. 18, 1924 |
| 1,729,631 | Stay | Oct. 1, 1929 |
| 2,072,650 | Schmeller, Sr. | Mar. 2, 1937 |
| 2,426,389 | Chew | Aug. 26, 1947 |